United States Patent
Phillips et al.

(10) Patent No.: US 9,593,591 B2
(45) Date of Patent: Mar. 14, 2017

(54) ENGINE HEALTH MONITORING AND POWER ALLOCATION CONTROL FOR A TURBINE ENGINE USING ELECTRIC GENERATORS

(71) Applicants: ROLLS-ROYCE CORPORATION, Indianapolis, IN (US);
ROLLS-ROYCE NORTH AMERICAN TECHNOLOGIES, INC., Indianapolis, IN (US)

(72) Inventors: Steven D. Phillips, Avon, IN (US);
Tom M. Neuman, Marietta, GA (US);
Michael Armstrong, Avon, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 436 days.

(21) Appl. No.: 14/127,096

(22) PCT Filed: Nov. 26, 2013

(86) PCT No.: PCT/US2013/071885
§ 371 (c)(1),
(2) Date: Dec. 17, 2013

(87) PCT Pub. No.: WO2014/143219
PCT Pub. Date: Sep. 18, 2014

(65) Prior Publication Data
US 2015/0369138 A1 Dec. 24, 2015

Related U.S. Application Data

(60) Provisional application No. 61/778,694, filed on Mar. 13, 2013.

(51) Int. Cl.
*F01D 21/00* (2006.01)
*F02C 7/32* (2006.01)
(Continued)

(52) U.S. Cl.
CPC ............ *F01D 21/00* (2013.01); *F02C 7/32* (2013.01); *F02C 7/36* (2013.01); *F02C 9/28* (2013.01);
(Continued)

(58) Field of Classification Search
None
See application file for complete search history.

(56) References Cited

U.S. PATENT DOCUMENTS 4,215,412 A 7/1980 Bernier
5,363,317 A 11/1994 Rice et al.
(Continued)

FOREIGN PATENT DOCUMENTS

EP 2099111 A2 9/2009
EP 2275346 A2 1/2011

OTHER PUBLICATIONS

U.S. Appl. No. 61/778,694, filed Mar. 13, 2013.
(Continued)

*Primary Examiner* — Adam Tissot
*Assistant Examiner* — Timothy Nesley
(74) *Attorney, Agent, or Firm* — Barnes & Thornburg LLP

(57) ABSTRACT

A control for a turbine engine using electrical machines monitors engine health and allocates power extraction between the electrical machines.

16 Claims, 8 Drawing Sheets

(51) Int. Cl.
*F02C 7/36* (2006.01)
*F02C 9/28* (2006.01)
*G05B 23/02* (2006.01)
*G05B 19/048* (2006.01)
*G07C 5/00* (2006.01)
*G07C 5/08* (2006.01)

(52) U.S. Cl.
CPC ....... *G05B 19/048* (2013.01); *G05B 23/0294* (2013.01); *G07C 5/004* (2013.01); *G07C 5/0808* (2013.01); *F05D 2220/323* (2013.01); *F05D 2220/76* (2013.01); *F05D 2260/80* (2013.01); *F05D 2260/81* (2013.01); *F05D 2260/821* (2013.01); *F05D 2270/053* (2013.01); *F05D 2270/20* (2013.01); *F05D 2270/335* (2013.01); *F05D 2270/44* (2013.01); *G05B 2219/24015* (2013.01); *Y02T 50/671* (2013.01)

(56) References Cited

U.S. PATENT DOCUMENTS

| | | |
|---|---|---|
| 5,694,765 A | 12/1997 | Hield et al. |
| 6,434,473 B1 | 8/2002 | Hattori |
| 6,591,182 B1 | 7/2003 | Cece et al. |
| 6,823,253 B2 | 11/2004 | Brunell |
| 6,895,741 B2 * | 5/2005 | Rago ............... F01D 15/10 60/226.1 |
| 6,909,960 B2 | 6/2005 | Volponi et al. |
| 7,219,040 B2 | 5/2007 | Renou et al. |
| 7,285,871 B2 | 10/2007 | Derouineau |
| 7,468,561 B2 | 12/2008 | Kern et al. |
| 7,505,844 B2 | 3/2009 | Wiseman et al. |
| 7,552,582 B2 | 6/2009 | Eick et al. |
| 7,571,045 B2 | 8/2009 | Muramatsu |
| 7,605,483 B2 | 10/2009 | Kern et al. |
| 7,615,881 B2 | 11/2009 | Halsey et al. |
| 7,622,821 B2 | 11/2009 | Mehrer et al. |
| 7,777,358 B2 | 8/2010 | Halsey et al. |
| 7,860,635 B2 | 12/2010 | Litt |
| 7,884,491 B2 | 2/2011 | Halsey et al. |
| 7,926,287 B2 | 4/2011 | Ullyott et al. |
| 8,039,983 B2 | 10/2011 | Cote et al. |
| 8,185,292 B2 | 5/2012 | Litt |
| 8,209,101 B2 | 6/2012 | Breit |
| 8,304,927 B2 | 11/2012 | Cote et al. |
| 2005/0056021 A1 * | 3/2005 | Belokon ............... F02C 3/113 60/772 |
| 2006/0174629 A1 | 8/2006 | Michalko |
| 2007/0137214 A1 * | 6/2007 | Zewde ............... F02C 9/18 60/782 |
| 2008/0149445 A1 * | 6/2008 | Kern ............... F01D 15/10 192/3.56 |
| 2008/0238202 A1 | 10/2008 | Kern et al. |
| 2008/0275597 A1 | 11/2008 | Gaulmin et al. |
| 2010/0023239 A1 | 1/2010 | Self et al. |
| 2010/0241331 A1 * | 9/2010 | Duke ............... F01D 25/18 701/100 |
| 2011/0036093 A1 | 2/2011 | Dooley |

OTHER PUBLICATIONS

International Search Report, International Application No. PCT/US2013/071885, May 2, 2014, 5 pages.
Zahringer et al., "Towards the Powerhouse for More Electric Aircraft—Dedicated Engine Concepts," Dec. 31, 2009, http://www.mtu.de/en/technologies/engineering_news/development/Zaehringer_Towards_the_Powerhouse_en.pdf.

* cited by examiner

ENGINE HEALTH MONITORING AND POWER ALLOCATION CONTROL FOR A TURBINE ENGINE USING ELECTRIC GENERATORS

CROSS REFERENCE TO RELATED APPLICATIONS

This application is a U.S. national counterpart application of international application serial No. PCT/US2013/071885 filed Nov. 26, 2013, which claims priority to U.S. Provisional Patent Application No. 61/778,694 filed Mar. 13, 2013. The entire disclosures of PCT/US2013/071885 and U.S. Ser. No. 61/778,694 are hereby incorporated by reference.

FIELD OF THE DISCLOSURE

The present disclosure relates generally to turbine engines and more specifically to power extraction and power management systems for multi-shaft turbine engines.

BACKGROUND

Gas turbine engines are used to power aircraft, watercraft, power generators, and the like. Gas turbine engines typically include a compressor, a combustor, and a turbine. A fan or propeller may be used to draw air into the engine. The compressor compresses the air and delivers higher-pressure air to the combustor. In the combustor, fuel is mixed with the higher-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In multi-shaft turbine engines, some of the engine components may drive or be driven by different shafts. Power can be extracted from these shafts to drive the components of the engine and/or an electrical system. For example, gas turbine engines may include a single gearbox mounted starter/generator or PMA (permanent magnet alternator) used to provide power to the electrical systems.

Existing techniques for assessing engine health are performed off-line. For example, engine parameters may be monitored and recorded during operation, and then compared to known trends and models after an operation has concluded, i.e., at some predetermined maintenance interval.

SUMMARY

The present application discloses one or more of the features recited in the appended claims and/or the following features which, alone or in any combination, may comprise patentable subject matter.

According to at least one embodiment of this disclosure, a control for a turbine engine having a plurality of shafts and one or more electrical machines coupled to the shafts includes an engine health monitor to monitor the health of the turbine engine over time; and a power allocation optimizer to allocate power extraction between the electrical machines based on the health of the turbine engine.

According to at least one embodiment of this disclosure, a method for controlling the allocation of power extracted from a plurality of shafts of a turbine engine, where the shafts each have one or more electrical machines coupled thereto, includes monitoring the health of the turbine engine over time; and allocating power extraction between the electrical machines based on the health of the turbine engine. The method may include obtaining, from the engine, an indicator of current fuel flow to the engine; and comparing the current fuel flow to a healthy engine profile. Any of the foregoing methods may include obtaining, from one or more control units coupled to the electrical machines, data relating to a current power extraction allocation; and comparing the current power extraction allocation to a healthy engine profile. Any of the foregoing methods may include obtaining, from the engine, data relating to a current operating condition of the engine; and adjusting the power extraction allocation based on the current operating condition.

According to at least one embodiment of this disclosure, a control for a turbine engine having a plurality of shafts and one or more electrical machines coupled to the shafts may be configured to perform any of the foregoing methods.

According to at least one embodiment of this disclosure, a system for controlling the extraction and allocation of power from a turbine engine includes a low pressure turbine, coupled to the turbine engine via a low pressure shaft and configured to drive at least a fan of the turbine engine; a high pressure turbine, connected to the turbine engine via a high pressure shaft configured to drive at least a compressor of the turbine engine; electrical machines coupled to the low pressure shaft and the high pressure shaft, the electrical machines configured to extract rotational power from the low pressure shaft and the high pressure shaft and output electrical power; control units coupled to each of the electrical machines to control the amount of rotational power extracted by the electrical machines from the low pressure shaft and the high pressure shaft; and a power allocation optimizer to, during operation of the turbine engine, adjust the allocation of power extraction between the low pressure shaft and the high pressure shaft based at least in part on an indicator of the health of the engine. Embodiments of the system may be configured to perform any of the foregoing methods. Embodiments of any of the foregoing systems may include an engine health monitor in communication with the power allocation optimizer to assess engine health based on engine performance sensitivity to variations in shaft power extraction. In embodiments of any of the foregoing systems, the power allocation optimizer may optimize engine cycle performance by varying electrical system controls.

According to at least one embodiment of this disclosure, a system for controlling the extraction and allocation of power from a turbine engine includes a low pressure turbine, coupled to the turbine engine via a low pressure shaft and configured to drive at least a fan of the turbine engine; a high pressure turbine, connected to the turbine engine via a high pressure shaft configured to drive at least a compressor of the turbine engine; electrical machines coupled to the low pressure shaft and the high pressure shaft, the electrical machines configured to extract rotational power from the low pressure shaft and the high pressure shaft and output electrical power; control units coupled to each of the electrical machines to control the amount of rotational power extracted by the electrical machines from the low pressure shaft and the high pressure shaft; and an engine health monitor to assess engine health during operation of the engine, based on performance sensitivity of the turbine engine to variations in power extraction from the shafts.

According to at least one embodiment of this disclosure, a method for controlling the allocation of power extracted from a plurality of shafts of a turbine engine, the shafts having one or more electrical machines coupled thereto, includes receiving, via feedback control of the turbine engine, data relating to one or more turbine engine operating conditions including fuel flow, temperature, pressure, and/or speed; generating an assessment of the health of the turbine engine based on changes in the one or more operating conditions over time; using a model-based algorithm to predict a change in the health of the turbine engine based on the operating conditions and a healthy engine profile; determining an optimal power extraction allocation between the electrical machines based on the predicted change in engine health, the operating conditions, and one or more optimization parameters including fuel efficiency, engine performance, and/or engine reliability; and controlling the electrical machines to implement the optimal power extraction.

According to at least one embodiment of this disclosure, a control for a turbine engine having a plurality of shafts and one or more electrical machines coupled to the shafts includes an engine health monitor to develop an assessment of the health of the turbine engine dynamically over time using real-time feedback of sensed operating parameters from the turbine engine; and a power allocation optimizer to vary the allocation of power extraction between the electrical machines dynamically in response to the assessment of the health of the turbine engine. The engine health monitor may detect a trend in the allocation of power extraction between the electrical machines over time and develops the assessment of the health of the turbine engine based on the trend.

According to at least one embodiment of this disclosure, a method for controlling the allocation of power extracted from a plurality of shafts of a turbine engine, where the shafts have one or more electrical machines coupled thereto, includes, during operation of the turbine engine: monitoring a plurality of operating parameters of the turbine engine over time; assessing the health of the turbine engine over time based on the plurality of operating parameters as they are monitored; and varying the allocation of power extraction between the electrical machines over time in response to the assessing of the health of the turbine engine.

According to at least one embodiment of this disclosure, a method for controlling the allocation of power extracted from a plurality of shafts of a turbine engine, where the shafts have one or more electrical machines coupled thereto, includes, during operation of the turbine engine: receiving, via feedback control of the turbine engine, data relating to one or more turbine engine operating conditions including fuel flow, temperature, pressure, and/or speed; generating an assessment of the health of the turbine engine based on changes in the one or more operating conditions over time; using a model-based algorithm to predict a change in the health of the turbine engine based on the operating conditions and a healthy engine profile; determining an optimal power extraction allocation between the electrical machines based on the predicted change in engine health, the operating conditions, and one or more optimization parameters; and controlling the electrical machines to implement the optimal power extraction.

The method may include varying the power extraction allocation between the electrical machines in response to the predicted change in the health of the turbine engine. In the method, the electrical machines may include a low pressure generator shaft and a high pressure generator shaft, and the method may include increasing the power extraction from the low pressure generator shaft and decreasing the power extraction from the high pressure generator shaft. The method may include transferring power from one of the shafts to the other shaft. The method may include determining the optimal power extraction allocation to optimize fuel efficiency, engine performance, or engine reliability. The method may include continuously varying the optimal power extraction allocation in response to power demands. The method may include continuously varying the optimal power extraction allocation in response to changes in the turbine engine operating conditions. A control for a turbine engine having a plurality of shafts and one or more electrical machines coupled to the shafts may be configured to perform any of the foregoing methods.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
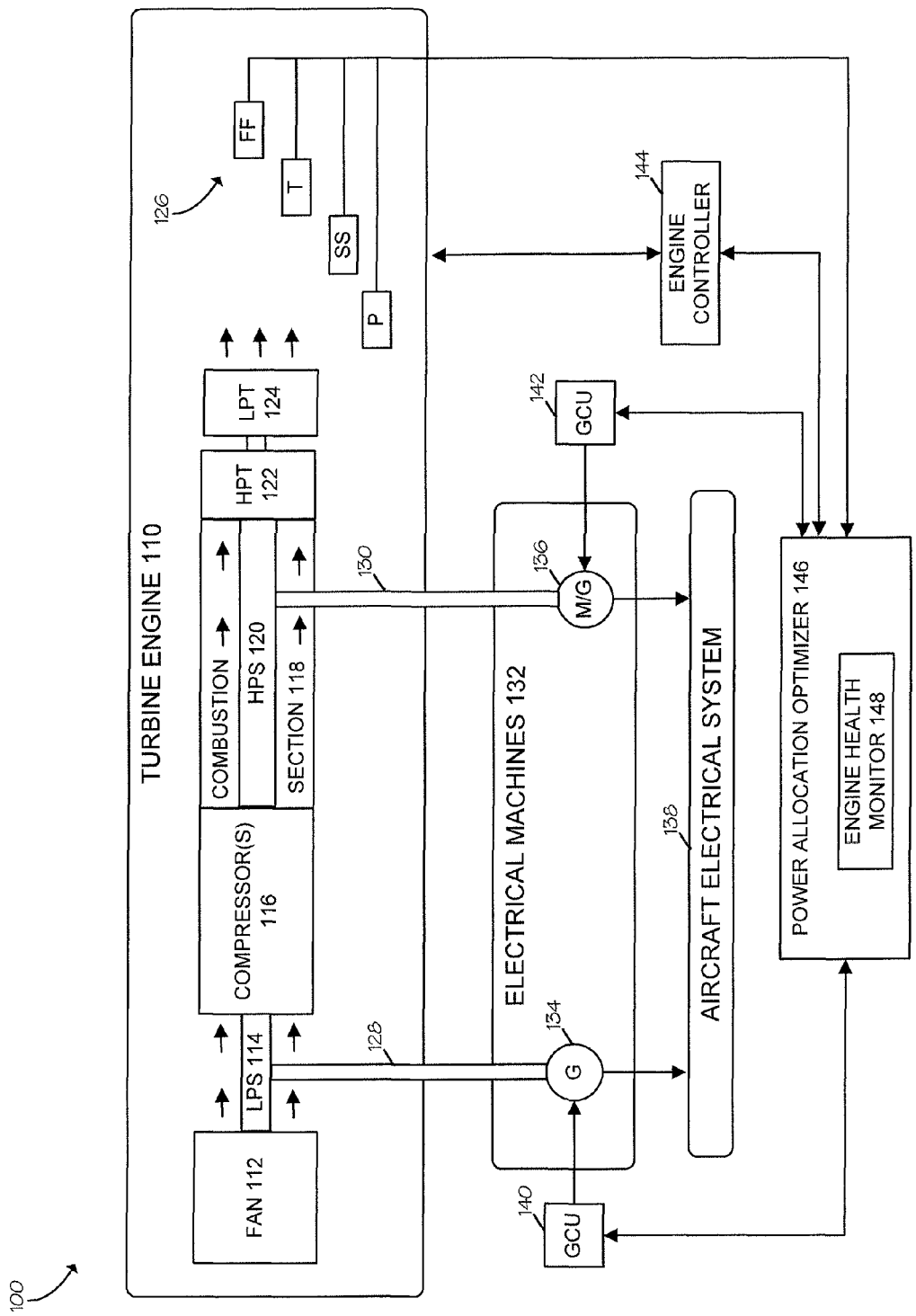
FIG. 1 is a simplified block diagram of at least one embodiment of a system for controlling the extraction and allocation of power from a turbine engine.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Online Power Extraction Tuning

Referring to FIG. 1, an embodiment of a system 100 for controlling the extraction and allocation of power from a turbine engine 110 includes a power allocation optimizer 146. The power allocation optimizer 146 is configured to optimize one or more optimization parameters (e.g., efficiency, performance, reliability, etc.) of the turbine engine 110 by varying the amount of power extracted from each shaft 114, 120 of the engine 110. In some embodiments, the power allocation optimizer 146 may be embodied in an engine controller 144 (which may be embodied as, for example, a Full Authority Digital Engine Controller or FADEC) and/or one or more generator control units 140, 142. In other embodiments, the power allocation optimizer 146 may be embodied in a separate controller that is in communication with the system via one or more electronic communication links or networks. The optimizer 146 utilizes real-time feedback control and on-line optimization to improve engine performance across a broad range of potential benefits. In some embodiments, the optimizer 146 incorporates engine health information obtained from an engine health monitor 148, described in more detail below, in its control techniques.

The illustrative turbine engine 110 is a multi-shaft turbofan gas turbine engine; however, aspects of the present disclosure are applicable to other types of multi-shaft turbine engines, including various types of turbofan and turboshaft systems. In the turbine engine 110, a fan 112 (e.g., a fan, variable pitch propeller, etc.) draws air into the engine 110. Some of the air may bypass other engine components and thereby generate propulsion thrust. The remaining air is forwarded to one or more compressors 116. For instance, in some embodiments, a low pressure compressor may increase the pressure of air received from the fan 112, and a high pressure compressor may further increase the pressure of air received from the low pressure compressor. In any event, the compressor(s) 116 increase the pressure of the air and forward the higher-pressure air to a combustion section 118. In the combustion section 118, the pressurized air is mixed with fuel, which is supplied to the combustion section 118 by a fuel supply such as a fuel injector (not shown). Typically, a flow meter, flow control valve, or similar device (e.g., a fuel flow sensor, FF 126) monitors and/or regulates the flow of fuel into the combustion section 118. An igniter (not shown) is typically used to cause the mixture of air and fuel to combust. The high-energy combusted air is directed to one or more turbines 122, 124. In the illustrative embodiment, a high pressure turbine 122 is disposed in axial flow series with a low pressure turbine 124. The combusted air expands through the turbines 122, 124, causing them to rotate. The combusted air is then exhausted through, e.g., a propulsion nozzle (not shown), which may generate additional propulsion thrust.

The rotation of the turbines 122, 124 causes the engine shafts 114, 120, to rotate. More specifically, rotation of the low pressure turbine drives a low pressure shaft 114, which drives the fan 112; while rotation of the high pressure turbine drives a high pressure shaft 120, which drives the compressor(s) 116. In some embodiments, the shafts 114, 120 may be concentrically disposed. In some embodiments, more than two shafts 114, 120 may be provided. For example, in some embodiments, an intermediate shaft is disposed concentrically between the low pressure shaft 114 and the high pressure shaft 120 and supports an intermediate-pressure compressor and turbine. In such embodiments, the power allocation optimizer 146 controls the power allocation among all of the available shafts in a similar manner to that described herein.

The illustrative turbines 122, 124 additionally drive one or more electrical machines 132 via respective power take-off assemblies 128, 130. The low pressure turbine 124 drives a generator 134 via the low pressure shaft 114 and the power take-off assembly 128. The high pressure turbine 122 drives a motor/generator 136 via the high pressure shaft 120 and the power take-off assembly 130. The electrical machines 132 can generate power, which may be supplied to an aircraft electrical system 138, for example. For instance, the generator 134 may generate electrical power that is supplied to other components or systems of the aircraft or other vehicle to which it is coupled. The motor/generator 136 may operate similarly, but may additionally have a motor mode in which it receives electrical energy from, for example, the aircraft electrical system 138, and converts the received electrical energy into rotational power, which is then supplied to the high pressure turbine 122 via the power take-off assembly 130.

The engine controller 144 controls the overall operation of the engine 110. For example, the engine controller 144 controls the rate of fuel flow to the combustion section 118, as well as the airflow through the engine 110 (e.g., by varying the pitch angle of vanes of the fan 112). The engine controller 144 receives signals from a number of different sensors 126, which are installed at various locations on the engine 110 to sense various physical parameters such as temperature (T), shaft speed (SS), air pressure (P), and fuel flow (FF), which represent various aspects of the current operating condition of the engine 110. The sensors 126 supply electrical signals representing the sensed information to the engine controller 144 and/or the power allocation optimizer 146. In response to the sensor signals, the engine controller 144 supplies various commands to the engine 110 to control various aspects of the operation of the engine 110.

The power allocation optimizer 146 communicates with the engine controller 144 to obtain the parameters sensed by the sensors 126, or otherwise obtains those parameters (e.g., via an electrical communication link or network), over time. Based on the changes in the current operating conditions over time as reflected in the sensed parameter data values (which may indicate, among other things, the current power extraction allocation between the shafts 114, 120), the power allocation optimizer 146 makes an inference about or determines an assessment of the current state of the engine 110's level of degradation (or "engine health"). To do this, the power allocation optimizer 146 may compare the data values representing the current operating conditions that are indicators of engine health to an engine health profile (e.g., using a lookup table), or apply a mathematical formula or model to the current data values to arrive at an estimation of the current level of degradation, for example.

Based on the currently determined level of degradation/engine health, the power allocation optimizer 146 determines a new optimal power allocation between the two shafts 114, 120 in accordance with an optimization objective (e.g., component life, fuel efficiency, etc.). For example, if the changes over time in the monitored operating conditions indicate that the system 100 is favoring or beginning to favor the low pressure shaft 114 over the high pressure shaft 120, the optimizer 146 may infer that a turbine coupled to the high pressure shaft 120 has experienced some degradation, and/or may calculate an estimated amount of such degradation. Based on the estimated amount of performance degradation, the power allocation optimizer 146 may calculate a new optimal power allocation between the two shafts 114, 120. The optimal power allocation may be the same as or different than the current or previously calculated power allocation, depending on, for example, the optimization objective. For instance, in normal operation, the power extraction initially may be allocated disproportionately to one of the shafts 114, 120 (e.g., 85 horsepower drawn from the high pressure shaft 120 and 15 horsepower (hp) drawn from the low pressure shaft 114), for optimal fuel efficiency or other reasons. As the engine ages, the efficiency of the high pressure shaft 120 may decrease. As a result, the power allocation optimizer 146 may shift the power allocation to increase the power extracted from the low pressure shaft 114 (e.g., toward a 50 hp/50 hp split of power extraction from the shafts 114, 120), in order to reduce the load on the high pressure shaft 120 and thereby extend the life of the high pressure shaft 120 (by reducing the rate of wear on the high pressure shaft 120). The power allocation optimizer 146 may be configured to optimize any of a number of different performance metrics, including fuel efficiency, component life, and/or others. For example, if fuel efficiency is considered of higher importance than component life, the power allocation optimizer 146 may determine a different optimal power allocation between the shafts 114, 120 than it would if component life were the priority.

The power allocation optimizer 146 sends commands (e.g., control signals) to the generator control units 140, 142, to implement the dynamically-determined optimal power allocation as it changes over time based on the dynamically determined engine health parameters. For example, based on a current estimation of engine health, the power allocation optimizer 146 may determine a percentage of power extraction for each shaft 114, 120, e.g., 55% for the low pressure shaft 114 and 45% for the high pressure shaft 120. The generator control units 140, 142 then command the generators 134, 136 to extract the appropriate load (e.g., a torque value or ratio such as 10 horsepower/20 horsepower) from the respective shafts 114, 120. Illustratively, the power allocation optimizer 146 seeks a power allocation to result in optimal fuel efficiency, and thus seeks to minimize the fuel flow parameter. In other embodiments, other parameters or a combination of different parameters may be optimized, such as temperature, available power, and other parameters to optimize performance, reliability, or other objectives.

The generator control units 140, 142 configure the generators 134, 136, respectively. That is, the generator control units 140, 142 adjust the operating parameters of the generators 134, 136 to vary the amount of rotational (mechanical) energy that the generators 134, 136 draw from the shafts 114, 120, respectively. For instance, the generator control unit 140 may configure the generator 134 to either generate electrical energy or not generate electrical energy, based on current operating conditions. Similarly, the generator control unit 142 may configure the motor/generator 136 to operate either in motor mode (in which it converts electrical energy to rotational power) or generator mode (in which it generates electrical energy from rotational power), or neither of the above, based on current operating conditions. Additionally, the generator control units 140, 142 control the amount of electrical energy that is generated by the generators 134, 136, respectively, based on control signals received from the power allocation optimizer 146. Adjustments in the amount of electrical energy supplied by the generators 134, 136 may vary based on the amount of electrical energy demanded by the aircraft electrical system 138 and/or the desired amount of engine power as determined by, for example, performance or fuel efficiency considerations. These and/or other factors can be used by the power allocation optimizer 146 to determine an appropriate division of power extraction across the shafts 114, 120. The power allocation optimizer 146 thus acts in cooperation with the engine controller 144 and the generator control units 140, 142 to control the amount of rotational energy that the motors/generators 134, 136 extract from the shafts 114, 120, respectively.

Figure 2:
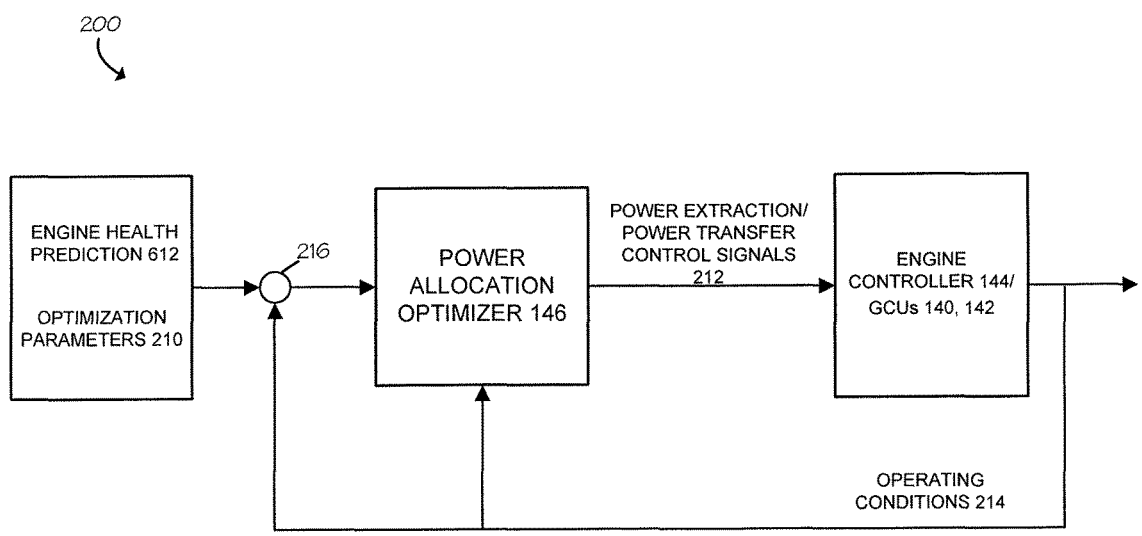
FIG. 2 is a simplified block diagram of at least one embodiment of a method for controlling electrical power extraction from electrical machines of a turbine engine.

Referring now to FIG. 2, an embodiment 200 of the power allocation optimizer 146 embodies a control technique for turbine engines with electric motor/generators 134, 136 coupled to the low pressure (LP) and high pressure (HP) shafts 114, 120, and intermediate pressure (IP) shaft(s), if present. The power allocation optimizer 146 manages the amount of electric power that is produced by either electrical machine 134, 136 so that the engine 110 is always operating at its optimum operating point. When extracting electrical power from a multi-shaft turbine engine, engine efficiency, performance, or reliability, for instance, can be optimized by varying the amount of power extracted from either shaft 114, 120. At certain points in the operating envelope, one shaft 114, 120 may be more efficient than another, so the optimum power extraction allocation constantly varies depending on the operating point and total power demand.

The control method employed by the embodiment 200 of the power allocation optimizer 146 uses both model-based algorithms and real-time feedback from the engine 110 to execute a run-time on-line optimization that continuously tunes the power extracted from either shaft 114, 120 according to desired optimization parameters 212 (e.g., performance, fuel efficiency, reliability, etc.) and using an engine health prediction 612 produced by the engine health monitor 148 (FIG. 7), to maximize the benefit to the engine 110, while still meeting the power demands of the aircraft or other vehicle in which the engine 110 is employed. In some cases, the control algorithm may specify, alternatively or in addition, an amount of power to be transferred between shafts 114, 120 (e.g., from one shaft 114, 120 to another shaft 114, 120). The optimization parameters can be set to maximize fuel efficiency, component life and reliability, or engine performance metrics, such as power available or surge margin, according to the requirements of a particular design or operating scenario.

Naturally, as a mechanical system, the engine 110's performance and/or efficiency may degrade over time due to wear and tear. As a result, over time, the optimum power allocation across the shafts 114, 120 may change such that the optimum power allocation for an aged engine may be different than that of a new engine. The power allocation optimizer 146 uses parameters such as fuel flow, temperature, pressure, and/or shaft speed (the corresponding data values of which are representative of current operating conditions 214, and which are obtained by the controller 216 via feedback from the engine 110), to continuously monitor the engine's performance and health. Further, the power allocation optimizer 146 can compensate for the changes in engine performance and/or engine health, over time. Using the feedback from the engine 110, the power allocation optimizer 146 can optimize the performance for any input or operating conditions as they change over time.

The power allocation optimizer 146 can be implemented as a control algorithm that schedules power extractions from the generators 134, 136. In some embodiments, the power allocation optimizer 146 can be implemented completely independent of the engine controller 144 and/or the generator control units 140, 142, because the illustrative power allocation optimizer 146 does not have direct control over the engine 110's operation or the operation of the generators 134, 136. However, in some embodiments, the power allocation optimizer 146 may be implemented as a part of these controls as well, as it may share many input data signals that feed to these other control units. The control algorithm can thus allow for improvements in fuel efficiency, reliability, life, and performance on engines with electric motor/generators coupled to multiple engine shafts. Engine performance can be continuously optimized throughout the engine's life leading to, for example, longer time in operation (e.g., time "on wing") and reduced cost of maintenance and servicing.

Figure 3:
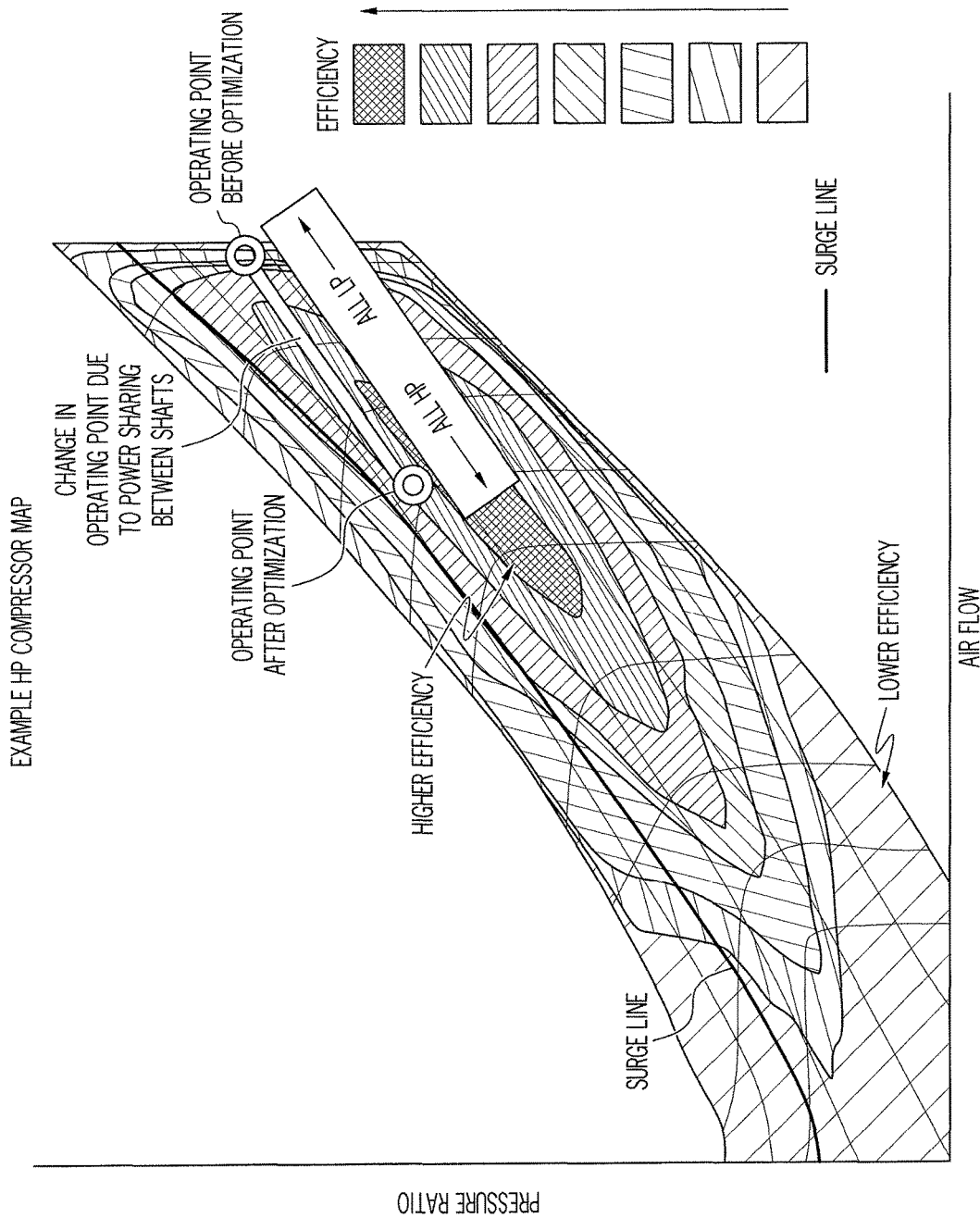
FIG. 3 is a simplified plot showing pressure ratio for a high pressure compressor in relation to air flow through the engine, during operation of a turbine engine.
Figure 8:
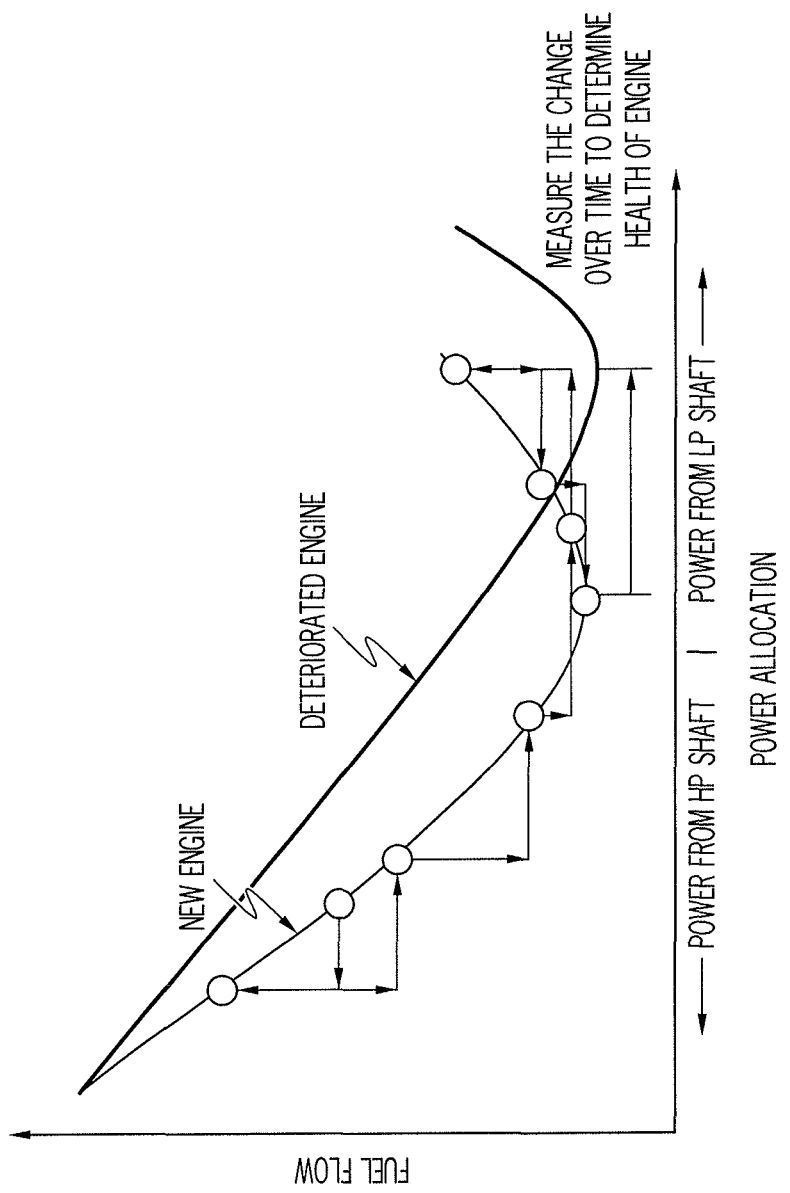
FIG. 8 is a simplified plot showing fuel flow in relation to power allocation between a high pressure shaft and a low pressure shaft and illustrating differences between a new engine and an engine in a deteriorated condition.

Referring now to FIGS. 3-5 and 8, additional details of the power allocation optimizer 146 are illustrated. FIG. 3 illustrates an example of a typical operating map for the compressor 116. In FIG. 3, it can be seen that electrical power sharing between two shaft-mounted generators can yield favorable results, such as higher fuel efficiency, increased surge margin, and improved transient stability. The generators 134, 136 on each shaft 114, 120, respectively, can be used to alter the operating point of the engine 110 (e.g., the amount of airflow at some pressure ratio, yielding thrust) by varying the amount of power extraction or power transfer between the shafts to, for example, push the engine 110's operating point back to a more desirable condition. In FIG. 3, the optimal point is closer to the middle of the concentric circular bands, for optimal fuel efficiency. In accordance with FIG. 8, the power allocation optimizer 146 can determine an optimal power allocation using, for example, a gradient-based optimization technique that can account for the features of a continuously variable system, which may include, e.g., altitude and operating condition changes, aircraft weight changes (which may change thrust demand), and/or fluctuating power demands. The illustrative technique seeks an optimal power allocation but does not fully converge, so that it continues to seek a new optimum as the inputs change over time. This is in contrast to a static table of lookup values, which cannot respond to changes in the engine 110's operating point over time. Further, the illustrative technique filters out very noisy data (e.g., sensor noise). FIG. 8 illustrates how the optimization algorithm may step down over time seeking the optimum power allocation for fuel efficiency. Once the optimal point is found, the optimizer 146 can control the power allocation by sending a command to one or more of the generator control units 140, 142, to achieve the optimum fuel flow.

Figure 4:
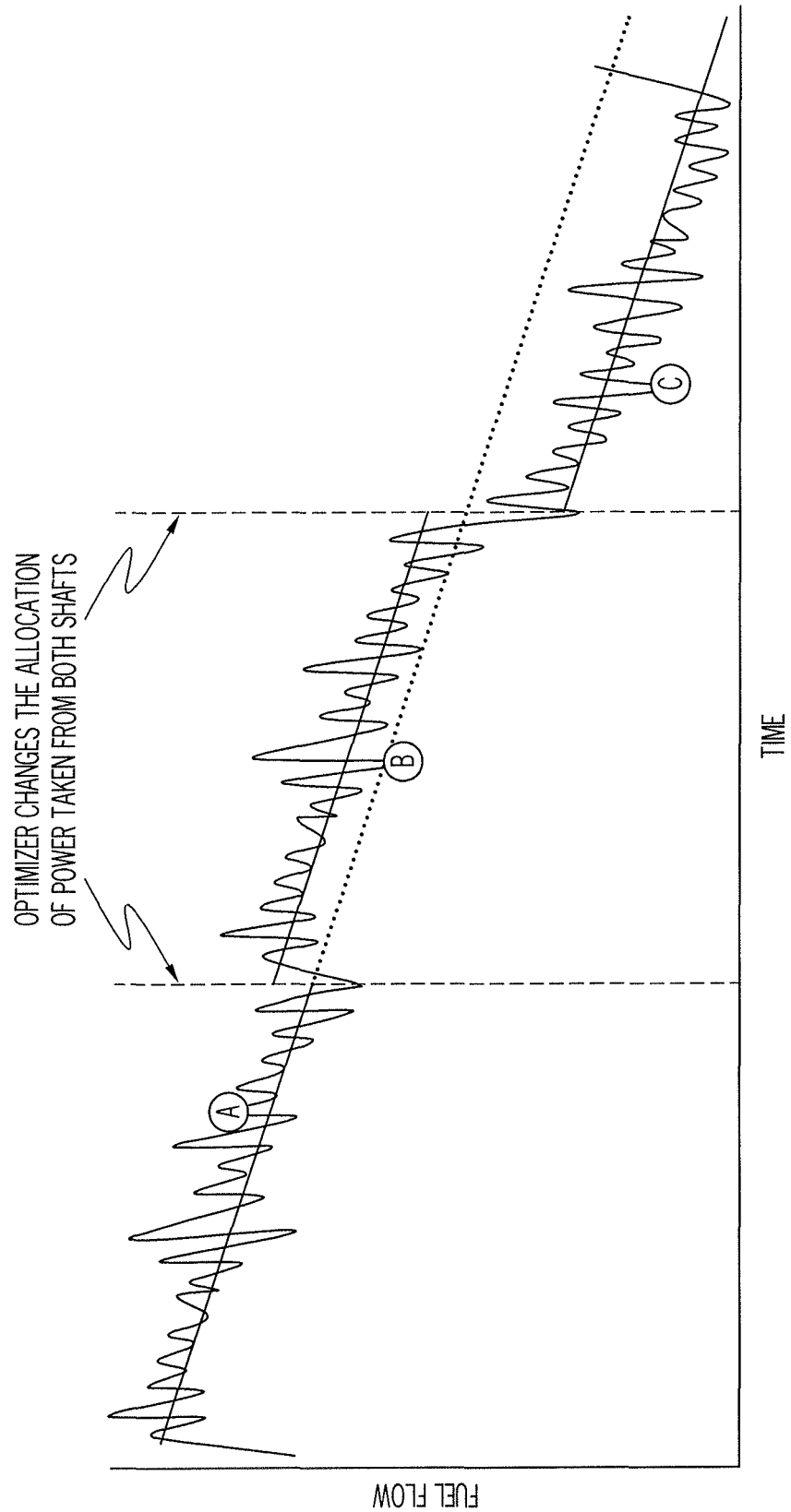
FIG. 4 is a simplified plot showing fuel flow to a turbine engine over time; illustrating changes in fuel flow resulting from changes in power allocation commanded by the illustrative power allocation optimizer described herein.

In FIG. 4, an example of the effect of the power allocation optimizer 146 on fuel flow to the engine 110 is shown. In particular, the plot shows that as the optimizer 146 changes the allocation of power taken from the shafts 114, 120, fuel efficiency is increased. Under normal operating conditions, fuel flow constantly decreases over time, due to decreasing thrust demand as the aircraft weight decreases. The optimizer 146 adjusts the percentage of power take from either shaft 114 or shaft 120 to find the lowest fuel usage. From the plot, it can be seen that for instantaneous points A and B, B uses less fuel than A. However, this may be due to better power sharing allocation, or just sensor noise and lower thrust demand. By taking the derivative of time averaged samples and making some assumptions of the surface being locally planar during small time periods, the optimizer 146 can determine that the instantaneous point C has the greatest improvement in fuel flow and set the new optimal power allocation accordingly.

Figure 5:
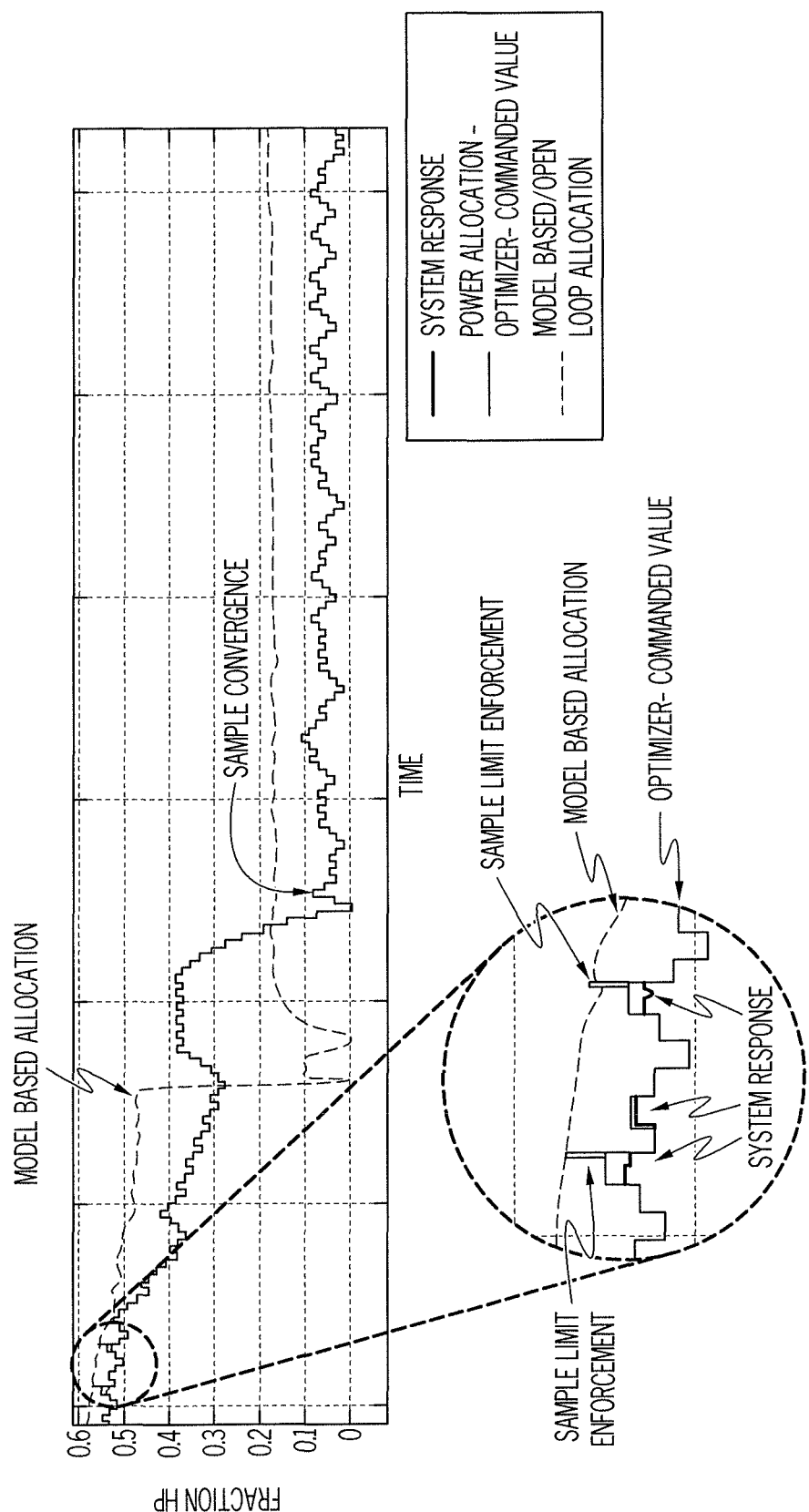
FIG. 5 is a simplified plot of power allocation to a high pressure shaft over time in response to commands issued by the illustrative power allocation optimizer described herein.

Referring to FIG. 5, the plot shown therein illustrates how the system 100 may respond to the optimizer-commanded values. As shown, the optimizer 146 can enforce limits of the system 100, whether they may be due to the requirements or specifications of the engine 110 or one or more of the generators 134, 136. More generally, the optimizer 146 can intelligently control power extraction allocation to minimize fuel burn under any operating conditions and can adapt to different, unique engine builds. As such, the same logic can be applied across a wide variety of engine models.

Engine Health Monitoring

When electrical power is extracted from a multi-shaft turbine engine, engine efficiency or performance can be changed by varying the amount of power extracted from either shaft. At certain points in the operating envelope one shaft may be more efficient than another, so the effect that the power extraction has is constantly variable depending on the operating point and condition of the engine. As the engine ages and wears, these trends will begin to shift and favor different power allocations depending on how the components are deteriorating in the engine. By trending the changes in the optimal power allocations between the shafts over time, and comparing those changes to a baseline engine model (e.g., a healthy engine profile), a prediction can be made as to the current health of the engine. For instance, once an inference as to the engine 110's current degradation is made (e.g., based on a power extraction allocation that favors the low pressure shaft over the high pressure shaft), the engine health monitor 148 can apply the engine model (e.g., healthy engine profile) to better predict the time to the next maintenance event or time to failure. These predictions can be communicated by the engine health monitor 148 or some other component of the system 100, to the vehicle operator, maintenance staff, and/or others, by a electronic communication link, visual display, or audio notification, for instance.

As an example, for an engine with a given customer load of 100 horsepower, a new engine may show peak efficiency extracting 85 horsepower from the HP shaft (e.g., shaft 120), and the remaining 15 from the LP shaft (e.g., shaft 114). However as the engine ages the HP turbines (e.g., high pressure turbines 122) will generally wear faster than other components leading to a decrease in high pressure turbine efficiency. As a result, the engine will shift to favor LP power extraction more—perhaps leading to more of a 50-horsepower split on each shaft. This shift can be measured and recorded using, for example, run-time gradient-based optimization techniques. The measured shift can be compared to recorded data and model-based health estimations to arrive at a predictive assessment of engine health.

In some embodiments, based on the wear characteristics of the engine 110, the engine health monitor 148 provides information that allows the power allocation optimizer 146 to compensate for the anticipated engine deterioration by changing how the power is extracted from either shaft 114, 120. The optimizer 146 can change the power extraction allocation in a way that continues to optimize for efficiency or other performance metrics. Alternatively or in addition, the optimizer 146 can compensate for the increased deterioration on the HP shaft 120 by further increasing the load on the LP shaft 114, therefore further reducing the load on the HP shaft 120 and thus reducing the rate of wear and extending the life of the HP shaft 120.

Figure 6:
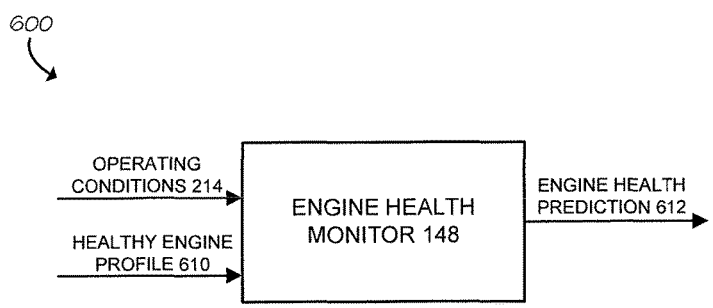
FIG. 6 is a simplified block diagram of at least one embodiment of a method for determining the health of a turbine engine.

Referring now to FIG. 6, an embodiment 600 of the engine health monitor 148 provides engine health monitoring and prognostics by monitoring the efficiency of the engine 110 as it relates to electrical power extraction. While shown in FIG. 1 as a sub-module of the power allocation optimizer 146, the engine health monitor 148 may be embodied in the engine controller 144, or as stand alone unit, for example, in other embodiments. The engine health monitor 148 monitors the health of the engine 110 by looking at fuel efficiency (or another desired optimization parameter 212) as it compares to variable power extraction from either of the engine shafts 114, 120. The engine health monitor 148 may be embodied as a method of using real time feedback of operating conditions 214 from the turbine engine 110 to determine the health of the engine 110 and/or one or more components of the engine 110 or of the system 100. The engine health monitor 148 receives and analyzes data relating to the turbine engines 110 and its electric motor/generators 134, 136 coupled to the LP and HP shafts 114, 120 (and the IP shaft if present). Some embodiments of the engine health monitor 148 utilize an on-line or real-time optimization and control algorithm, as described further below.

The engine health monitoring control method uses the existing engine feedback parameters 214 along with efficiency calculations 610 provided by the model-based control algorithms to provide engine health predictions 612. These trends will be different for each engine and operating condition, but the data for any engine can be gathered in a test cell and then incorporated into the model-based engine health monitoring algorithms. On a system that is already carrying multiple generators and the required controls and sensors, this added logic may only require a small amount of additional data storage to implement.

Better engine health monitoring and prognostics may allow for improved prediction of the condition of the engine, and may allow for increased operational time (e.g., "on wing" time) by making it less likely that an engine would be removed from service based on hours or service or number of cycles alone. The ability to have feedback about the engine's health in real time may help prevent servicing of an engine until it is actually required. Further, the engine health diagnostics can be done automatically by, e.g., the engine controller 144, during operation of the engine 110.

Figure 7:
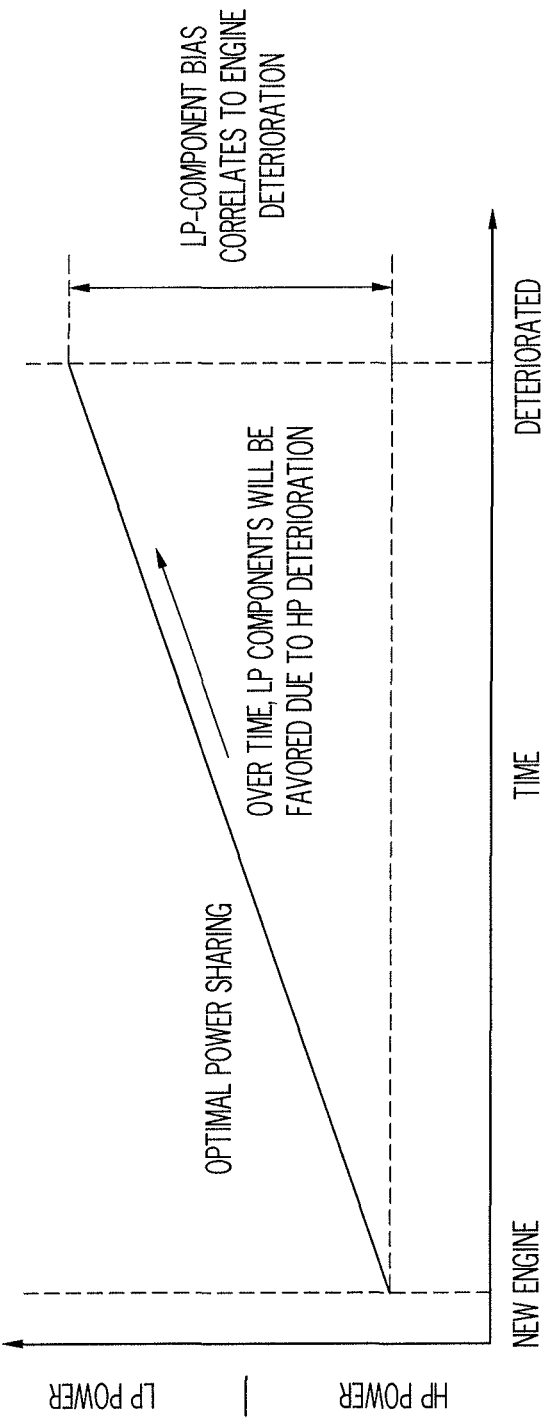
FIG. 7 is a simplified plot showing power allocation between a high pressure shaft and a low pressure shaft over time.

Referring now to FIGS. 7-8, aspects of the engine health monitor 148 are illustrated. In FIG. 7, a change in optimal power sharing over time as an engine ages is shown. For example, high pressure components may tend to deteriorate faster, causing the low pressure components to be favored. Thus, the bias toward the use of low pressure components (e.g., the shaft 114) for power generation can be used as an indicator of engine deterioration. In FIG. 8, the fuel flow curve for a new engine as power allocation changes from favoring the high pressure shaft 120 to favoring the low pressure shaft 114 is compared with the same curve for a deteriorated engine. As shown, the changes in fuel flow over time in relation to power allocation between the shafts 114, 120, in comparison to a new or healthy engine profile can be used as an indicator of engine deterioration.

Implementation Examples

Figure 9:
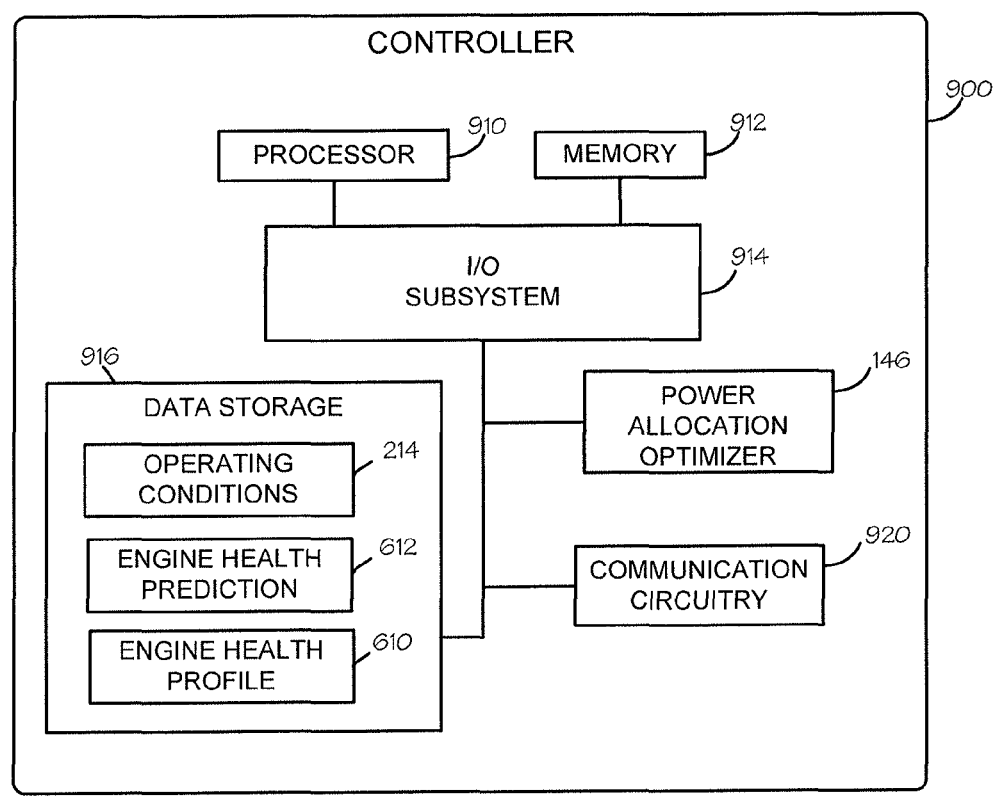
FIG. 9 is a simplified block diagram of a controller for a turbine engine.

Referring now to FIG. 9, a simplified block diagram of an exemplary controller 900, in which the power allocation optimizer 146 and the engine health monitor 148 may be embodied, is shown. The controller 900 includes at least one processor 910 (e.g. a microprocessor, microcontroller, digital signal processor, etc.), memory 912, and an input/output (I/O) subsystem 914. The controller 900 and/or portions thereof may be embodied in a control unit of the engine 110, or may be distributed among multiple components of the system 100, for example.

The I/O subsystem 914 typically includes, among other things, an I/O controller, a memory controller, and one or more I/O ports. The processor 910 and the I/O subsystem 914 are communicatively coupled to the memory 912. The memory 912 may be embodied as any type of suitable computer memory device (e.g., volatile memory such as various forms of random access memory).

The I/O subsystem 914 is communicatively coupled to one or more storage media 916, the power allocation optimizer 146, and communication circuitry 920. The storage media 916 may include any suitable data storage device (e.g., flash memory, memory cards, etc.). The storage media 916 may store data relating to engine operating conditions 214, engine health predictions 612 generated by the engine health monitor 148, and one or more engine health profiles 610, which may be used by the engine health monitor 148 to determine or predict engine health in terms of, for example, a degree of healthiness or deterioration. The communication circuitry 920 may include any suitable electronic communications link, bus, or network and may be configured to communicate control signals from the power allocation optimizer 146 to, for example, the generator control units 140, 142, and/or to communicate engine operating parameters from the engine 110 and/or sensors 126 to the power allocation optimizer 146. The controller 900 may include other components, sub-components, and devices not illustrated in FIG. 9 for clarity of the description. In general, the components of the controller 900 are communicatively coupled as shown in FIG. 9 by electronic signal paths, which may be embodied as any type of wired or wireless signal paths capable of facilitating communication between the respective devices and components.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for controlling an allocation of power extracted from a plurality of shafts of a turbine engine, the shafts having one or more electrical machines coupled thereto, the method comprising, with a controller, during operation of the turbine engine:
    monitoring a plurality of operating parameters of the turbine engine over time;
    assessing a health of the turbine engine over time based on the plurality of operating parameters as they are monitored, wherein the health of the turbine engine is indicative of a wear characteristic of the turbine engine; and
    varying the allocation of power extraction between the plurality of electrical machines over time in response to the assessing of the health of the turbine engine by assigning a part of a total power extraction to the one or more electrical machines coupled to each of the plurality of shafts.

2. The method of claim 1, comprising obtaining, from the turbine engine, an indicator of current fuel flow to the turbine engine; and comparing the current fuel flow to a healthy turbine engine profile.

3. The method of claim 2, comprising obtaining, from one or more control units coupled to the electrical machines, data relating to a current power extraction allocation; and comparing the current power extraction allocation to the healthy turbine engine profile.

4. The method of claim 3, comprising obtaining, from the turbine engine, data relating to a current operating condition of the turbine engine; and adjusting the power extraction allocation based on the current operating condition.

5. A control for a turbine engine having a plurality of shafts and one or more electrical machines coupled to the shafts, the control comprising one or more processor-executable modules embodied in non-transitory computer memory and configured to perform the method of claim 4.

6. A system for controlling an extraction and allocation of power from a turbine engine, the system comprising:
    a low pressure turbine, coupled to the turbine engine via a low pressure shaft and configured to drive at least a fan of the turbine engine;
    a high pressure turbine, connected to the turbine engine via a high pressure shaft configured to drive at least a compressor of the turbine engine;
    electrical machines coupled to the low pressure shaft and the high pressure shaft, the electrical machines configured to extract rotational power from the low pressure shaft and the high pressure shaft and output electrical power;
    control units coupled to each of the electrical machines to control the amount of rotational power extracted by the electrical machines from the low pressure shaft and the high pressure shaft; and
    non-transitory computer memory comprising a processor-executable power allocation optimizer to, during operation of the turbine engine, dynamically assess a health of the turbine engine based on a plurality of sensed operating parameters and adjust the allocation of power extraction between the low pressure shaft and the high pressure shaft based on the assessment of the health of the turbine engine, wherein the health of the turbine engine is indicative of a wear characteristic of the turbine engine.

7. The system of claim 6, wherein the non-transitory computer memory comprises a processor-executable engine health monitor in communication with the power allocation optimizer to assess turbine engine health based on turbine engine performance sensitivity to variations in shaft power extraction.

8. The system of claim 6, wherein the power allocation optimizer optimizes turbine engine cycle performance by varying electrical system controls.

9. A method for controlling an allocation of power extracted from a plurality of shafts of a turbine engine, the shafts having one or more electrical machines coupled thereto, the method comprising, with a controller, during operation of the turbine engine:
    receiving, via feedback control of the turbine engine, data relating to turbine engine operating conditions including one or more of a fuel flow, temperature, pressure, and speed;
    generating an assessment of the a health of the turbine engine based on changes in the one or more operating conditions over time;
    using a model-based algorithm to predict a change in the health of the turbine engine based on the operating conditions and a healthy turbine engine profile;
    determining an optimal power extraction allocation between the plurality of electrical machines based on the predicted change in turbine engine health, the operating conditions, and one or more optimization parameters;
    extracting power from the plurality of shafts; and
    controlling the electrical machines to implement the optimal power extraction
    wherein the plurality of electrical machines comprises a low pressure generator shaft and a high pressure generator shaft, and the method comprises increasing the power extraction from the low pressure generator shaft and decreasing the power extraction from the high pressure generator shaft.

10. The method of claim 9, comprising varying the power extraction allocation between the plurality of electrical machines in response to the predicted change in the health of the turbine engine.

11. The method of claim 10, comprising continuously varying the optimal power extraction allocation in response to power demands.

12. The method of claim 10, comprising continuously varying the optimal power extraction allocation in response to changes in the turbine engine operating conditions.

13. The method of claim 10, comprising assessing the health of the turbine engine based on changes in fuel flow over time and changes in power extraction from the plurality of electrical machines over time.

14. The method of claim 10, wherein the assessment of the turbine engine health indicates deterioration of the turbine engine health, and the method comprises adjusting the power extraction allocation to improve engine efficiency in response to the indication of turbine engine health deterioration.

15. The method of claim 9, comprising transferring power from one of the shafts to the other shaft.

16. The method of claim 9, comprising determining the optimal power extraction allocation to optimize fuel efficiency, engine performance, or engine reliability.

* * * * *